United States Patent
Kurniadi et al.

(10) Patent No.: US 10,671,935 B2
(45) Date of Patent: Jun. 2, 2020

(54) EVENT BASED BEHAVIOR PREDICTION, CLASSIFICATION, AND SERVICE ADJUSTMENT

(71) Applicant: PAYPAL, INC., San Jose, CA (US)

(72) Inventors: Fransisco Kurniadi, Dublin, CA (US); Navya Pedemane, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 1032 days.

(21) Appl. No.: 15/174,883

(22) Filed: Jun. 6, 2016

(65) Prior Publication Data

US 2017/0351965 A1 Dec. 7, 2017

(51) Int. Cl.
| | | |
|---|---|---|
| *G06Q 30/02* | (2012.01) | |
| *G06N 5/04* | (2006.01) | |
| *G06N 7/00* | (2006.01) | |
| *G06Q 40/02* | (2012.01) | |

(52) U.S. Cl.
CPC ............. *G06N 7/005* (2013.01); *G06N 5/045* (2013.01); *G06Q 30/0207* (2013.01); *G06Q 40/02* (2013.01)

(58) Field of Classification Search
CPC ........ G06N 7/005; G06N 5/045; G06Q 40/02; G06Q 30/0207
See application file for complete search history.

(56) References Cited

U.S. PATENT DOCUMENTS

| | | | |
|---|---|---|---|
| 9,959,563 B1 * | 5/2018 | Wu ..................... | G06Q 30/0631 |
| 2009/0094219 A1 * | 4/2009 | Davis .................... | G06Q 10/06 |
| 2013/0132269 A1 * | 5/2013 | Abiola ............... | G06Q 10/0635 |
| | | | 705/38 |
| 2017/0316511 A1 * | 11/2017 | Chang .................. | G06Q 40/12 |

OTHER PUBLICATIONS

Shuford, Emir H., Albert, Arthur, and Edward Massengill, H. Admissible probability measurement procedures. Psychometrika, 1966. pp. 125-145. (Year: 1966).*
Bertsekas, D. and Tsitsiklis, J. Introduction to Probability vol. 2. Athena Scientific, 2008. (Year: 2008).*
Prinzie, A. and Van Den Poel, D. Modeling complex longitudinal consumer behavior with Dynamic Bayesian networks: an Acquisition Pattern Analysis Application. J Intell Inf Syst, 2011.pp. 283-304. (Year: 2011).*

* cited by examiner

*Primary Examiner* — Li Wu Chang
(74) *Attorney, Agent, or Firm* — Haynes and Boone, LLP

(57) ABSTRACT

Various systems, mediums, and methods for providing services may involve data engines configured to generate scores associated with one or more entities and then to classify the entities based on the scores. The data engine may collect data and based on the collected data may generate a first behavior model in a first time span, and a second and third behavior models in a second time span. The data engine may generate a first score based on the first behavior model, a second score based on the second behavior model, and a third score based on the third behavior model. The data engine may generate a final score based on the first, second, and third scores. The data engine can classify the entity based on the final score. The data engine can then automatically adjust one of the services provided to the entity based on the final score.

20 Claims, 8 Drawing Sheets

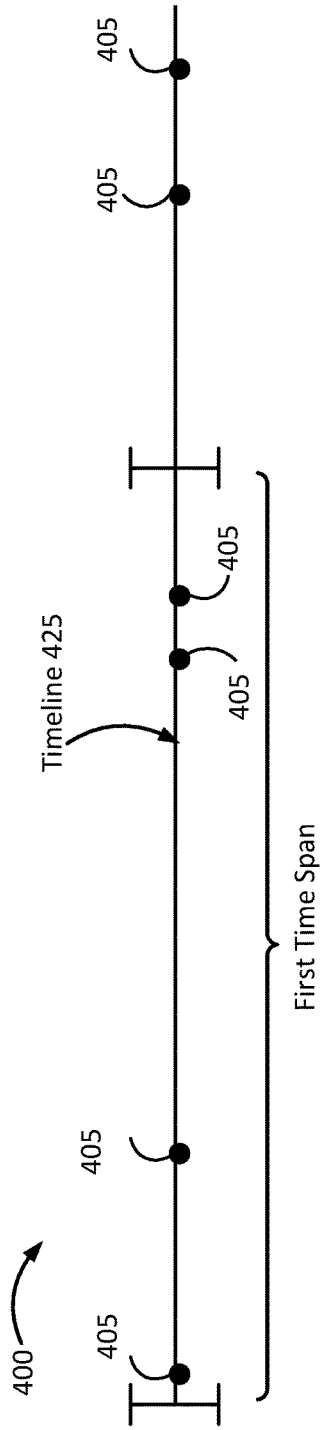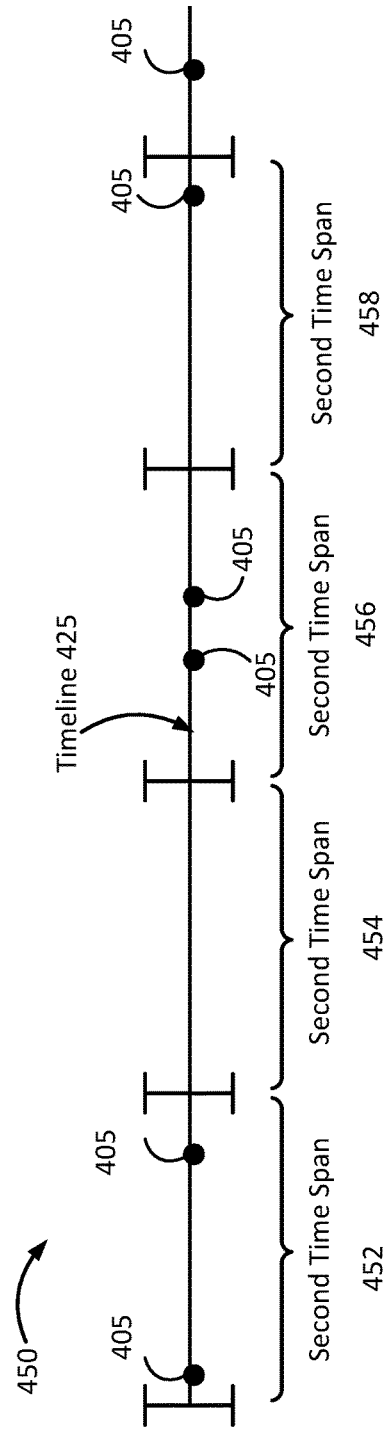

EVENT BASED BEHAVIOR PREDICTION, CLASSIFICATION, AND SERVICE ADJUSTMENT

TECHNICAL FIELD

Embodiments disclosed herein are related to systems and methods for predicting behavior of an entity that provides or receives services. The behavior prediction can be based on events occurring in multiple time spans. The entity can be classified based on the prediction and the services can be adjusted based on the classification.

BACKGROUND

Various types of data engines involve a number of inputs and one or more corresponding outputs. In particular, the inputs may be provided by one or more sources. Also, a data engine may determine which inputs to utilize and which inputs to discard, possibly based on the particular sources that provide the inputs. Under various circumstances, the data engine may utilize such selected inputs to determine one or more corresponding scores.

Multiple types of scores may be computed. In some examples, a score may reflect a given performance of an entity in a predetermined period of time. In some examples, the score may reflect working hours of an entity in a week, duration of physical exercises of a person in a day, and/or the like. Also, the score may reflect completing assigned tasks of an entity in predetermined deadlines, payment of bills by the deadlines (e.g., on-time payment), and/or the like. In some examples, the score may be based on various inputs, analyses, computations, and/or evaluations implemented by the data engine on qualifying events received in one or more predetermined periods of time. Yet, in some respects, the computed score may be utilized to determine potential risks possibly associated with the particular entity. In some examples, the computed score may be inaccurate or erroneous, possibly leading to unreliable measures associated with the particular entity.

Various types of data engines may involve generating or gathering data related to different features of an object and/or a behavior and then, based on the data, generating one or more scores related to the features of the object and/or the behavior and then based on the scores of different features may generate a final score for the object and/or the behavior. A classification module may then classify the object and/or the behavior based on the final score.

As demonstrated above, there is much need for technological advancements in various aspects of data engines and related technologies to accurately determine scores generated by the data engines.

BRIEF DESCRIPTION OF THE FIGURES

FIG. 4A illustrates an exemplary timeline with events on the timeline according to some embodiments.

FIG. 4B illustrates an exemplary timeline with events on the timeline according to some embodiments.

Figure 1:
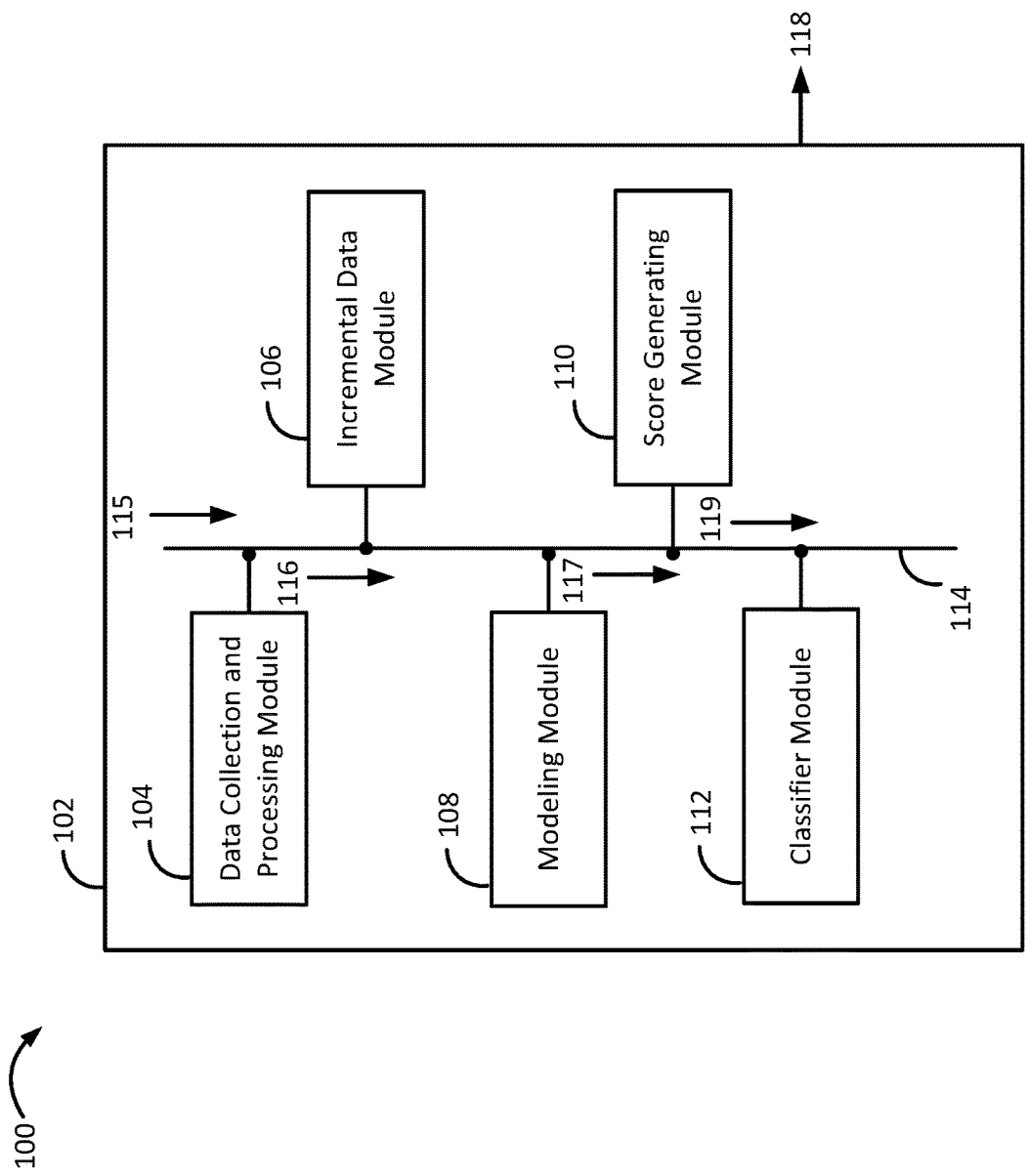
FIG. 1 is a block diagram of an exemplary system, according to some embodiments.

Embodiments of the present disclosure and their advantages may be understood by referring to the detailed description provided herein. It should be appreciated that reference numerals may be used to illustrate various elements and/or features provided in the figures. Further, the figures may illustrate various examples for purposes of illustration and explanation related to the embodiments of the present disclosure and not for purposes of any limitation.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

In some embodiments, a system provides one or more services to an entity and the system monitors a performance of the entity with respect to one or more events, goals, or outcomes associated with the provided services. Alternatively, the entity provides services and a system monitors the performance of an entity with respect to services provided by the entity. An entity may include a person, a company, an enterprise, a firm, a factory, a device, a bridge, a street, among other things. In some examples, the entity is a factory and utility services are provided to the factory and a score may be associated with the utility usage of the factory. In some examples, the entity is a device such as a refrigerator and electric power is provided to the refrigerator and a score may be associated with the power usage of the refrigerator. In some examples, the entity is a street or a bridge that provides traffic services and a score may be associated with the congestion of the street or bridge. Example embodiments herein describe data engines and related technologies to generate accurate scores for entities that accurately classify the entity and consequently adjust the services.

Consistent with some embodiments, there is provided a system having a non-transitory memory for storing at one or more databases. The system provides one or more services to an entity. The system includes one or more hardware processors that are configured to execute instructions. The instructions when executed as one or modules by the one or more hardware processors and to cause the system to perform operations described herein.

In some embodiments, the system collects data corresponding to the performance of the entity. The data is collected by a data collection and processing module of a data engine of the system from the databases of the system.

In some embodiments, a first behavior model is generated. A modeling module of the data engine generates the first behavior model based at least on the collected data. The first behavior model is associated with the performance of the entity in a first time span. Also, an occurrence of a predetermined event is determined by the data engine (e.g., whether the event happens) in the first time span. The first time span may optionally correspond to a future time span following the current time.

In some embodiments, a second behavior model and a third behavior model are also generated. The second behavior model and the third behavior model are generated by the modeling module and based at least on the collected data. The second behavior model and the third behavior model are associated with the performance of the entity in a second time span. The second time span is different from the first time span and may optionally correspond to a future time span following the current time. The second behavior model may further be based on the occurrence of the predetermined event in the first time span and the third behavior model is further based on the non-occurrence of the predetermined event in the first time span.

In some embodiments, based at least on the first behavior model, a first score is generated by the score generating module of the data engine corresponding to the occurrence of the predetermined event. The score generating module also generates a second score based at least on the second behavior model and a third score based at least on the third behavior model. The second and third score correspond to the predefined outcome (e.g., likelihood of occurrence of the outcome) in the second time span. A final score is generated by the score generating module of the data engine, based at least on the first score, second score, and the third score. The final score corresponds to achieving a predefined outcome related to the performance of the entity in a final time span. The final time span may optionally correspond to a future time span after the current time and may have a duration greater or equal to a minimum of the first time span and second time span.

In some embodiments, a classifier module of the data engine then classifies the entity into two or more groups. The classification is based at least on the final score. At least one of the one or more services provided by the system to the entity is adjusted based on the final score, the classification, or both the final score and classification.

Consequently, as described, embodiments described herein may allow providing services to an entity, e.g., a person, a factory, a company, a store, a bridge, a street, and/or the like based on scores. The embodiments also describe achieving one or more outcomes by the entity. The embodiments described herein may then determine (e.g., classify), based on the scores, which one of the goals or outcomes is possible/achievable by the entity. The embodiments described herein may further determine, based on the scores and classification, which corrective or stopping measures should be applied to/by the entity.

In various circumstances, the example embodiments described herein may resolve various challenges with regards to monitoring and automatically adjusting services provided by an entity or alternatively, automatically adjusting services provided to an entity. As such, the example embodiments described herein may resolve problems that did not exist before the availability of the computer networks, particularly generating scores related to future outcomes and automatically adjusting services provided to or by an entity. Notably, the modules may be implemented with hardware, software, or possibly with aspects of both hardware and software.

FIG. 1 is a simplified block diagram of an exemplary system 100, according to some embodiments. The system 100 may provide one or more services to an entity. As shown, the system 100 includes a data engine 102. The data engine 102 includes a data collection and processing module 104, possibly also referred to as an initial data collection and processing module 104. Further, the data engine 102 includes a modeling module 108. Yet further, the data engine 102 includes an incremental data module 106. In addition, the data engine 102 includes a score generating module 110 and a classifier module 112. In some embodiments, the data collection and processing module 104, the incremental data module 106, the modeling module 108, the score generating module 110, and the classifier module 112 may be implemented using hardware components, such as a processor, an application specific integrated circuit (ASIC), a programmable system-on-chip (SOC), a field-programmable gate array (FPGA), and/or programmable logic devices (PLDs), among other possibilities. As shown, the data collection and processing module 104, the incremental data module 106, the modeling module 108, the score generating module 110, and the classifier module 112 may be coupled to a bus, network, or other connection 114. Yet, it should be noted that any two or more of the data collection and processing module 104, the modeling module 108, the incremental data module 106, the score generating module 110, and the classifier module 112 may be combined within a single hardware component, such as the programmable SOC.

The data collection and processing module 104 may be configured to collect data 115. The data collection and processing module 104 may also be configured to process the collected data 115. As shown, the data collection and processing module 104 may output the processed data 116. Further, the data engine 102 may supply the modeling module 108 and the score generating module 110 with the processed data 116. In some examples, the data collection and processing module 104 may collect data 115 during an initial data gathering phase. The collected data 115 may be associated with various aspects of one or more entities. In particular, the collected data 115 may include details of the one or more entities related to performances of the entities, possibly including an indication of performance associated with the one or more entities. The indication of performance may include a range of performance, possibly spanning from high performance to mild performance, to low performance, and/or no performance. Further, the indication of performance may include a time span of performance possibly spanning from an hour, to a day, to a week, to a month, to a year, to several years, and/or the like. The collected data 115 may include details of individuals, companies, objects, events, and/or the like identified as the one or more entities related to the performances. As noted above, the system 100 may be used for a number of different systems and thus the details of the entities may depend on the entity and may include physical, structural, financial, and/or other characteristics of the entities.

As noted, the data collection and processing module 104 may be configured to gather the collected data 115. In some embodiments, the collected data 115 may be processed based on the data collection and processing module 104 and/or the configurations of the data collection and processing module 104, as described further herein. In some instances, the data collection and processing module 104 may detect text data from the collected data 115 and convert the text data to numeric data. As such, the text describing the characteristics of the entities may be converted from text data to numeric data. In some instances, the numeric data may be part of the collected data 115 transferred to the data collection and processing module 104.

In some embodiments, the data collection and processing module 104 may normalize the collected data 115. In some examples, the data collection and processing module 104 may normalize the collected data 115 such that the data related to the one or more characteristics described above may be compared. For instance, data associated with the usage of an entity may be compared with the data associated with the capacity of the entity. In some instances, the values representing different scores of the entity may be normalized to the same or similar scale, such as a scale from zero to one hundred. With various such values measured on the same scale, the values may be compared and/or analyzed accordingly. In some examples, when the score is related to an outcome, the normalized score may be interpreted as a percent probability of the outcome to occur.

In some instances, the data collection and processing module 104 may normalize the collected data 115 by organizing, arranging, ordering, and/or structuring the collected data 115. Further, the data collection and processing module 104 may normalize the collected data 115 by removing redundant data sets from the collected data 115. In some instances, the data collection and processing module 104 may normalize the collected data 115, where the collected data 115 may correspond to the one or more of the characteristics of the entities described above, such as the usage, the capacity, the assets, the liabilities, the statements, and/or the like associated with the entities. As such, the characteristics may be structured into a number of tables to minimize the size of the collected data 115, without losing information or data. In some instances, the collected data 115 may be normalized based on the configuration of data collection and processing module 104, the configurations of the modeling module 108, the configurations of the score generating module 110, and/or the configurations of the classifier module 112.

In some embodiments, the data collection and processing module 104 may detect and/or remove one or more outliers from the collected data 115. As noted, respective values representing the characteristics of the entity (e.g., the usage, the capacity, the assets, the liabilities, the score, and/or the like of the entity) may be normalized to the same or similar scale, such as a scale from zero to one hundred. Further, the data collection and processing module 104 may detect and/or remove outliers from the collected data 115 based on the deviations of the outliers from mean values associated with the collected data 115. In particular, the data collection and processing module 104 may detect outliers by retrieving a number of samples from the collected data 115. The data collection and processing module 104 may determine a mean value that corresponds to the number of samples. The data collection and processing module 104 may also determine a standard deviation associated with the samples. In some examples, the data collection and processing module 104 may detect and remove one or more outliers from a given data based at least on that outliers deviating from the mean data value by more than some multiple, such as 2.5, 3.0, and/or the like, of the standard deviation.

In some embodiments, the data collection and processing module 104 may process and configure the data for the modeling module 108. As shown, the data collection and processing module 104 may transfer the processed data 116 to the modeling module 108, possibly over the bus, network, or other connections 114 to generated behavior models 117. In some instances, the processed data 116 may also be transferred to the score generating module 110 from the modeling module 108. In some instances, the one or more scores may be obtained based on transferring the generated behavior models 117 and the processed data 116 to the score generating module 110. In some instances, the one or more results 118 may be obtained based on transferring the generated scores 119 to the classifier module 112. In some examples, the classifier module 112 may output the one or more results 118, possibly due to classifying the entity based on at least the scores obtained from the score generating module 110 and possibly other characteristics of the entity described above. In some examples, the scores may be related to achieving a predefined outcome corresponding to a performance of the entity and the classifier module 112 may classify the entity based on achieving the predefined outcome. In some examples, if the results 118 include classifying the entity as not achieving the predefined output, then the system may stop service provided to the entity.

As described above, the system 100 may provide one or more services to the entity and/or the system 100 may monitor the performance of the entity. In some examples, based on the scores generated by the score generating module 110, or based on the classification output of the classifier module 112, based on both the scores and the classification, the system 100 may adjust the services provided to the entity. In some examples, if the scores are high the system 100 may improve the services to the entity, provide more services for the entity, and/or the like. Alternatively, if the scores are low the system 100 may reduce the services to the entity, stop one or more services of the entity, demand one or more services and/or a compensation from the entity, and/or the like.

In some embodiments, the incremental data module 106 may further introduce data, possibly based on receiving extra information including updated data. In some examples, the incremental data module 106 may collect additional data related to one or more given entities, possibly taking similar form to the collected data 115 including text and numerical data. In particular, the incremental data module 106 may process the additional data and transfer the processed data to the modeling module 108 to update the behavior models and to the score generating module 110 to update the generated scores 119. Further, the score generating module 110 may output the updated generated scores to the classifier module 112 to generate updated results, possibly taking similar form to the one or more results 118. As such, the incremental data module 106 may further enhance the modeling module 108 and the score generating module 110.

In some embodiments, the data collection and processing module 104 may transfer additional data and/or a stream of data to the modeling module 108 and the score generating module 110. In some examples, the data collection and processing module 104 may collect one or more streams of data, possibly where the data is associated with one or more additional entities. Further, the data collection and processing module 104 may transfer the data to the modeling module 108 and then to the score generating module 110 to obtain scores, possibly including a score that represents the one or more additional entities. In some instances, the score may take the form of a numerical expression. In particular, the score may further represent an assessment of trustworthiness, dependability, credibility, and/or risk, among other features and/or characteristics related to a performance associated with the one or more entities. In some instances, the score may be viewed as a search score, a travel score, a health score, a credit score, an approval score, and/or the like.

Figure 2A:
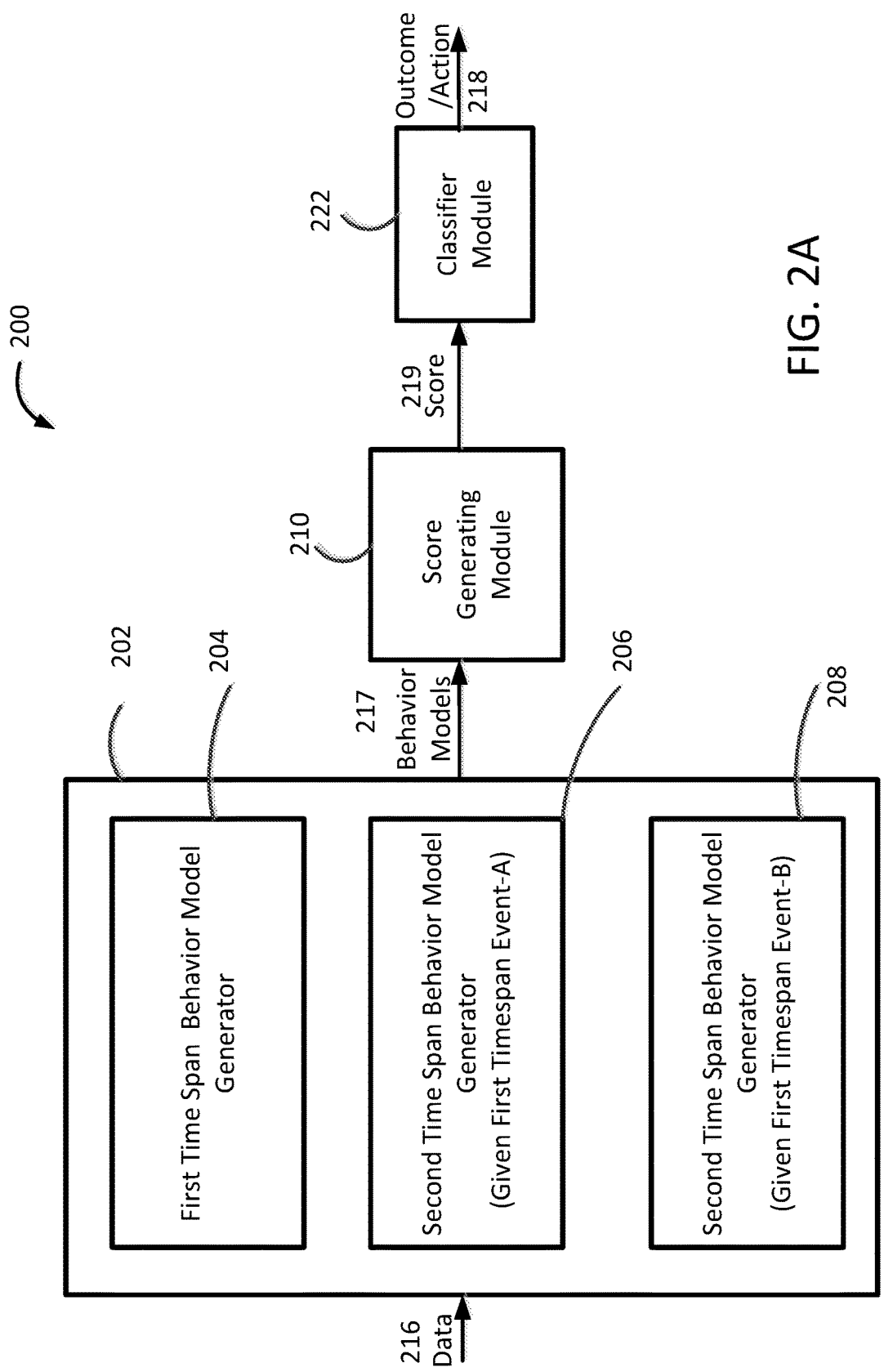
FIG. 2A is a block diagram of an exemplary data engine, according to some embodiments.

FIG. 2A is a block diagram of an exemplary data engine 200, according to some embodiments. The data engine 200 includes a modeling module 202, a score generating module 210 and a classifier module 222. In some embodiments, the data engine 200 is consistent with the data engine 102 of FIG. 1 or the data engine 350 of FIG. 3B. Yet further, the modeling module 202 includes a first time span behavior model generator 204 and second time span behavior model generators 206 and 208. In some examples, the first time span behavior model generator 204 receives data 216, consistent with processed data 116 of FIG. 1, and based on data 216, generates the first behavior model. The first behavior model is part of the behavior models 217 generated by the modeling module 202. In some examples, the second time span behavior model generators 206 and 208 receive data 216, consistent with processed data 116 of FIG. 1, and based on data 216, generates the second and third behavior models. The second and third behavior model are part of the behavior models 217 generated by the modeling module 202. In some examples, the behavior models 217 are consistent with the behavior models 117 of FIG. 1.

In some embodiments, the second time span behavior model generator 206 generates the second behavior model based on an occurrence of event-A (e.g., given event-A occurs) in the first time span, and the second time span behavior model generator 208 generates the third behavior model based on occurrence of the event-B (e.g., given event-B occurs) in the first time span. In some examples, the score generating module 210 generates the scores 219 that are consistent with the scores 119 of FIG. 1. The score generating module 210 uses the behavior models 217 and generates the first, the second, the third, and the final score. In some examples, the classifier module 222 may output the one or more actions/outcomes 218, possibly due to classifying the entity based at least on the scores 219 obtained from the score generating module 210 and possibly other characteristics of the entity described above.

In some examples, event-A is the predetermined event, and event-B is a complement (e.g., an opposite) of event-A such that the first score corresponds to the likelihood of an occurrence of the event-A in the first time span, e.g., the probability event-A occurring in the first time span. Also, the second score corresponds to an occurrence of the predefined outcome occurring in the second time span given event-A occurring in the first time span. Additionally, the third score corresponds to an occurrence of the predefined outcome occurring in the second time span given event-A not occurring in the first time span.

Figure 2B:
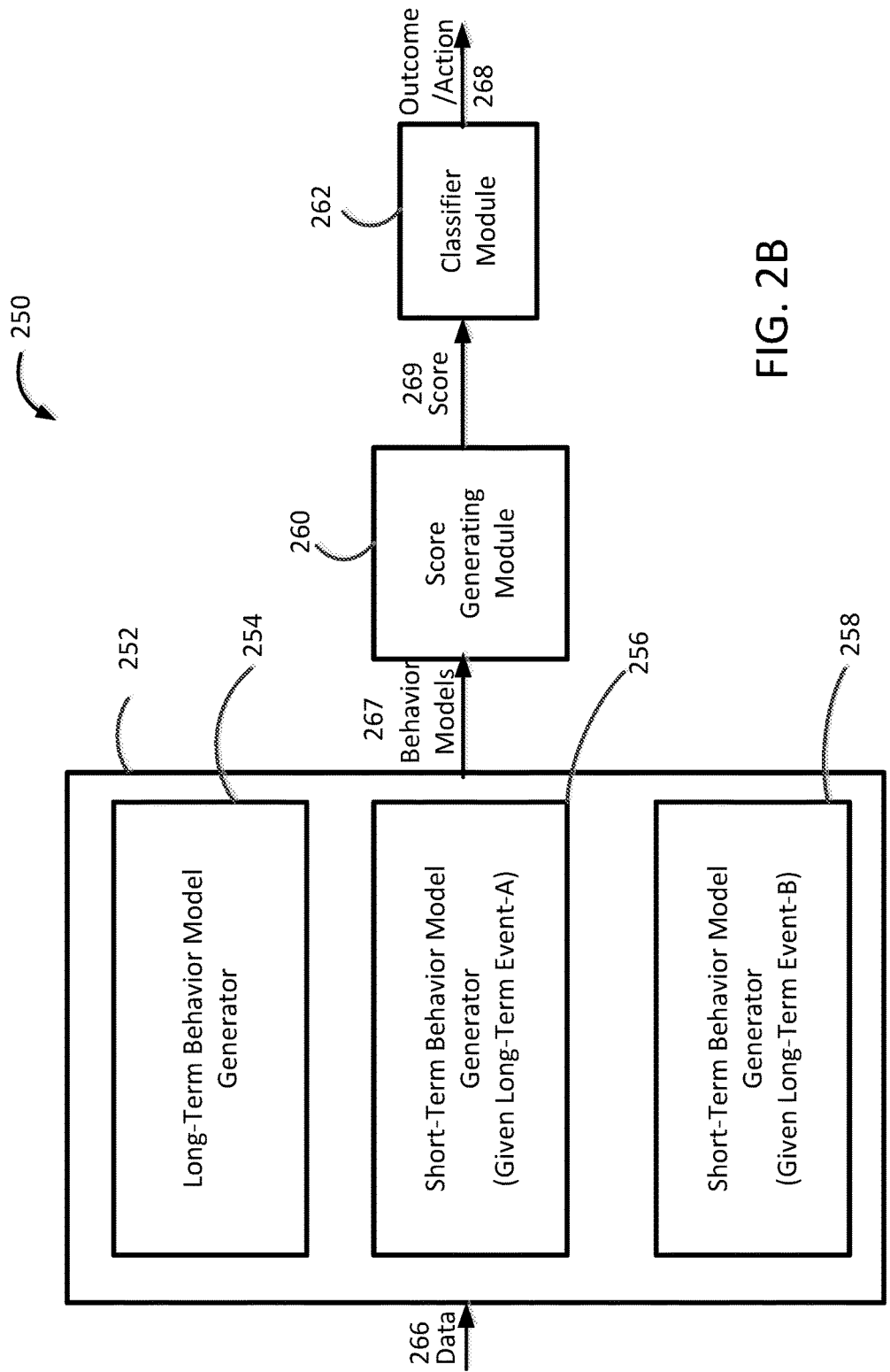
FIG. 2B is a block diagram of an exemplary data engine, according to some embodiments.

FIG. 2B is a block diagram of an exemplary data engine 250, according to some embodiments. The data engine 250 includes a modeling module 252, a score generating module 260 and a classifier module 262. In some embodiments, the data engine 250 may be consistent with the data engine 102 of FIG. 1 and/or data engine 350 of FIG. 3B. Yet further, the modeling module 252 includes a long-term behavior model generator 254 and short-term behavior model generators 256 and 258. In some examples, the long-term behavior model generator 254 receives data 266, consistent with processed data 116 of FIG. 1, and based on data 266, generates the first behavior model. The first behavior model is part of the behavior models 267 generated by the modeling module 252. The behavior models 267 are consistent with the behavior models 117 of FIG. 1. In some examples, the short-term behavior model generators 256 and 258 receive data 266, consistent with processed data 116 of FIG. 1, and based on data 266, generates the second and third behavior models. The second and third behavior model are part of the behavior models 267 generated by the modeling module 252. The behavior models 267 are consistent with the behavior models 117 of FIG. 1.

In some embodiments, the short-term behavior model generator 256 generates the second behavior model based on an occurrence of the event-A (e.g., given event-A occurs) in the long-term, and the short-term behavior model generators 258 generates the third behavior model based on occurrence of the event-B (e.g., given event-B occurs) in the long-term.

In some examples, the score generating module 260 generates the scores 269 that are consistent with the scores 119 of FIG. 1. The score generating module 260 uses the behavior models 267 and generates the first, the second, the third, and the final score. In some examples, the classifier module 262 may output the one or more actions/outcomes 268, possibly due to classifying the entity based at least on the scores 269 obtained from the score generating module 260 and possibly other characteristics of the entity described above.

In some examples, event-A is the predetermined event, and event-B is a complement (e.g., an opposite) of event-A such that the first score corresponds to the likelihood of an occurrence of the event-A in the long-term, e.g., the probability event-A occurring in the long-term. Also, the second score corresponds to an occurrence of the predefined outcome occurring in the short-term given event-A occurring in the long-term. Additionally, the third score corresponds to an occurrence of the predefined outcome occurring in the short-term given event-A not occurring in the long-term.

Figure 3A:
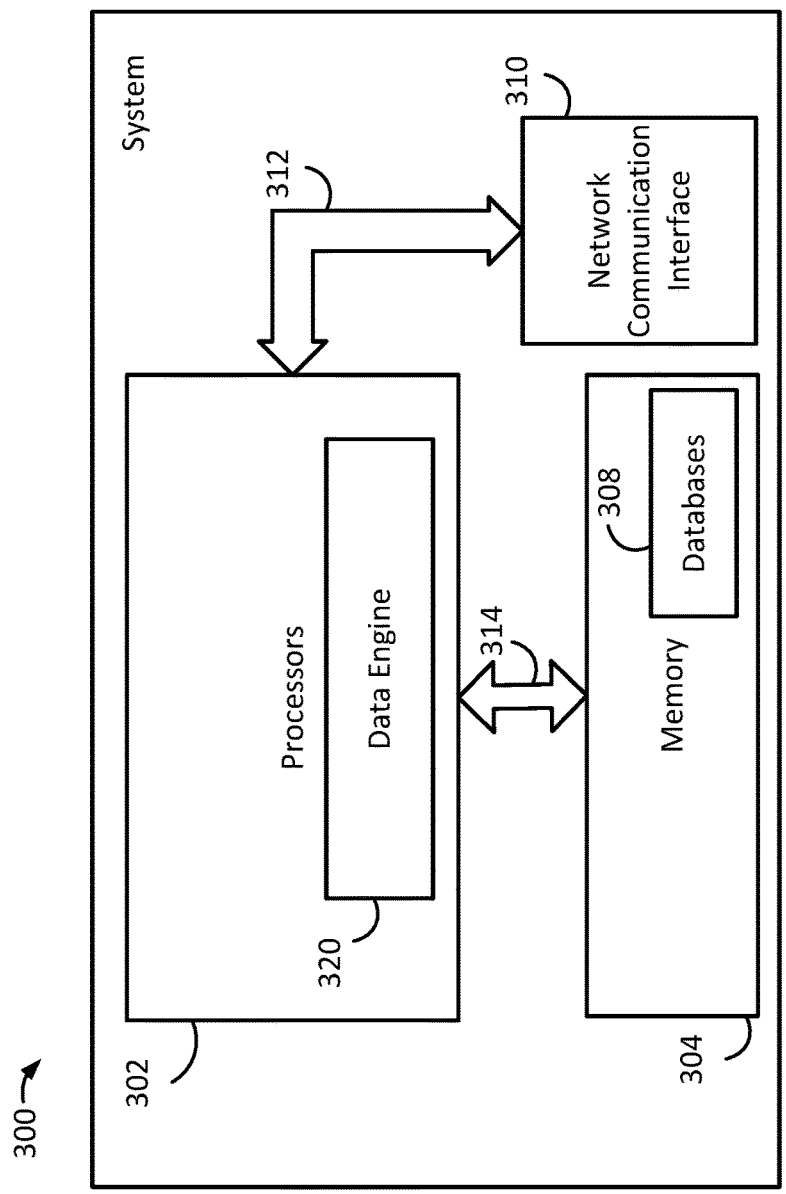
FIG. 3A is a block diagram of an exemplary system, according to some embodiments.

FIG. 3A is a simplified block diagram of an exemplary system 300, according to some embodiments. As shown, the system 300 includes one or more processors 302 that may execute the data engine 350. In some embodiments, the date engine 350 is consistent with the data engine 102 of FIG. 1. The system 300 includes a network communication interface 310. Yet further, the system 300 includes a communication link (e.g., bus) 312 between the processors 302 and the network communication interface 310. In addition, the system 300 includes another communication link (e.g., bus) 314 between the processors and the non-transitory memory 304. In some embodiments, the processors 302, the network communication interface 310, and the memory 304 may be implemented using hardware components, such as an application specific integrated circuit (ASIC), a programmable system-on-chip (SOC), a field-programmable gate array (FPGA), and/or programmable logic devices (PLDs), among other possibilities. Yet, it should be noted that any two or more of the processors 302, the network communication interface 310, and the memory 304 may be combined within a single hardware component, such as the programmable SOC.

Figure 3B:
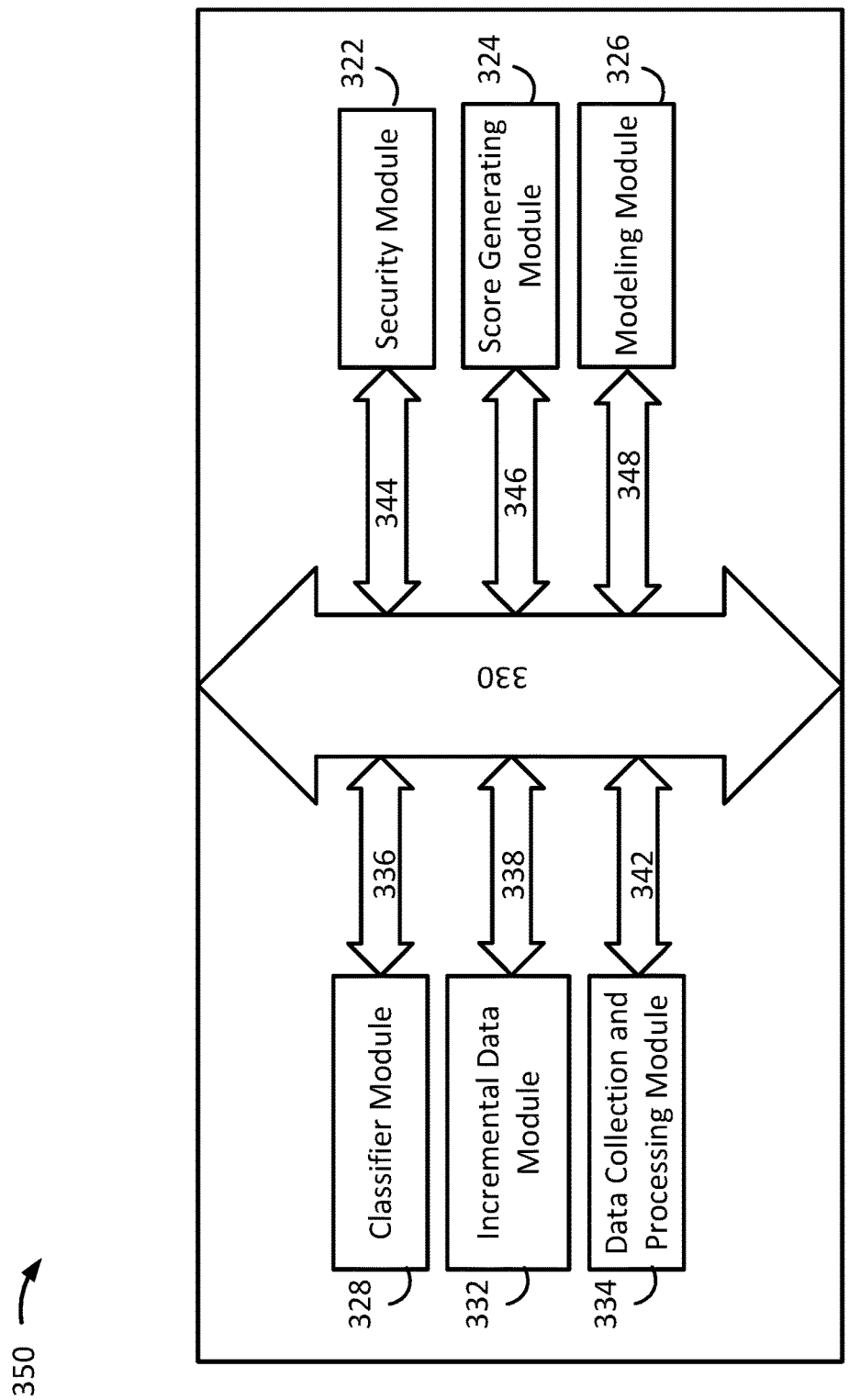
FIG. 3B illustrates an exemplary data engine, according to some embodiments.

FIG. 3B is a simplified block diagram of an exemplary data engine, according to some embodiments. In some embodiments, the data engine 350 may be consistent with the data engine 320 of FIG. 3A and execute on the processors 302 and/or the data engine 102 of FIG. 1. As described, the data engine 350 includes modules that may execute by the processors 302. The data engine 350 includes a data collection and processing module 334 and an incremental data module 332. Yet further, the data engine 350 includes a modeling module 326 and a score generating module 324. In addition, the data engine 350 includes a classifier module 328 and a security module 322. The modules of the data engine communicate with each other through the communication links 336, 338, 342, 344, 346, 348, and 330. The communication links are controlled by the processors 302 and communication may be performed through pipelines or memory buffers. In some embodiments, the data engine 350 may include hardware modules separate from the processors 302 that may communicate with each other and with the processors 302 through the communication links 336, 338, 342, 344, 346, 348, and 330.

In some embodiments, the data engine 350 may be consistent with the data engine 320 of FIG. 3A, and the data collection and processing module 334 may communicate through communication link 314 with the databases 308 and may collect (e.g., read) data from the databases 308. In some embodiments, the incremental data module 332 receives updated data, possibly from network communication interface 310 and through communication link 312. In some examples, the incremental data module 332 receives updated data through communication link 314 from the memory 304.

As noted, the data engine 350 and its modules may be implemented using hardware components. In some examples, the data collection and processing module 334, the incremental data module 332, the modeling module 326, the score generating module 324, the classifier module 328, and/or the security module 322 may be implemented using hardware components inside the system, e.g., system 300 of FIG. 3A, and the communication links 336, 338, 342, 344, 346, 348, and 330 may be implemented using communication buses such that the modules communicate through the communication link 330 with the processors 302 and possibly to the memory 304. Additionally the data engine 350 may be implemented using an application specific integrated circuit (ASIC), a programmable system-on-chip (SOC), a field-programmable gate array (FPGA), and/or programmable logic devices (PLDs), among other possibilities. Yet, it should be noted that any two or more of the module of the data engine 350 may be combined within a single hardware component, such as the programmable SOC.

Referring back to FIG. 1, in some embodiments, the modeling module 108 of the data engine 102 generates a first behavior model associated with the performance of the entity in a first time span. The modeling module generates the first behavior model based on the processed data 116. In some examples, the first behavior model predicts the performance of the entity in the first time span. In some examples, the modeling module 108 is consistent with the modeling module 326 of the data engine 350 in FIG. 3B. As shown in FIG. 1, the first behavior model is included in the behavior models 117 that are transferred through connections 114 to the score generating module 110. Also, in some examples, the behavior models 117 are consistent with the behavior models 217 and 267 in FIG. 2A and FIG. 2B. Additionally, in some examples, the modeling module 108 is consistent with the modeling modules 202 and 252 in FIG. 2A and FIG. 2B and the first behavior module is generated by the first time span behavior model generator 204 or the long-term behavior model generator 254.

In some embodiments, the modeling module 108 of the data engine 102 generates a second behavior model associated with the performance of the entity in a second time span. The modeling module generates the second behavior model based on the processed data 116 as well as based on the occurrence of the predetermined event in the first time span. In some examples, the second behavior model predicts the performance of the entity in the second time span given that the predetermined event occurs in the first time span. As shown in FIG. 1, the second behavior model is included in the behavior models 117 that are transferred through connections 114 to the score generating module 110. In some examples, the modeling module that generates the second behavior model is consistent with the modeling module 326 of the data engine 350 in FIG. Also, in some examples, the behavior models 117 are consistent with the behavior models 217 and 267 in FIG. 2A and FIG. 2B. Additionally, in some examples, the modeling module 108 is consistent with the modeling modules 202 and 252 in FIG. 2A and FIG. 2B and the second behavior module is generated by the second time span behavior model generator 206 or the short-term behavior model generator 256.

In some embodiments, the modeling module 108 of the data engine 102 generates a third behavior model associated with the performance of the entity in a second time span. The modeling module generates the third behavior model based on the processed data 116 as well as based on non-occurrence of the predetermined event in the first time span. In some examples, the second behavior model may predict the performance of the entity in the second time span given the predetermined event does not occur in the first time span. As shown in FIG. 1, the third behavior model is included in the behavior models 117 that are transferred through connections 114 to the score generating module 110. In some examples, the modeling module that generates the third behavior model may be consistent with the modeling module 326 of the data engine 350 in FIG. 3B. Additionally, in some examples, the modeling module 108 is consistent with the modeling modules 202 and 252 in FIG. 2A and FIG. 2B and the third behavior module is generated by the second time span behavior model generator 208 or the short-term behavior model generator 258.

In some embodiments, the second and third behavior models instead of being based on an occurrence and a non-occurrence of the same event (i.e., completely correlated events) are based on separate events where the separate events might be partially correlated or may be independent of each other.

In some embodiments, the score generating module 110 of the data engine 102 generates a first, a second, and a third score. The first score is generated based at least on the first behavior model and corresponding to an occurrence of the predetermined event. In some examples, the first score is a probability of the predetermined event happening in the first time span. The second score is generated based at least on the second behavior model, and the third score is generated based at least on the third behavior model. The second and third scores correspond to an occurrence of the predefined outcome. In some examples, the second score and the third score are probabilities of the predefined outcome happening in the second time span. As shown in FIG. 1, the generated scores may be included in the scores 119 that are transferred through connections 114 to the classifier module 112. In some examples, the score generating module 110 may be consistent with the score generating module 324 of the data engine 350 in FIG. 3B. Also, in some examples, the score generating module 110 is consistent with the score generating module 210 and 260 in FIG. 2A and FIG. 2B.

In some embodiments, the score generating module 110 of the data engine 102 generates a final score. The final score corresponds to achieving the predefined outcome corresponding to the performance of the entity in a final time span. The final time span is greater than or equal to a minimum of a first time span and a second time span. In some examples, the first time span is 3 months, the second time span is one month, and the final time span is also one month.

In some embodiments, the classifier module 112 of the data engine 102 classifies the entity into two or more groups. In some examples, the classifier module 112 classifies the outcome into two groups, a first group of entities that are likely to achieve the predefined outcome, and a second group of entities that are not likely to achieve the predefined outcome. In some examples, the classifier module 112 may be consistent with the classifier module 328 of the data engine 350 in FIG. 3B. Also, in some examples, the classifier module 112 is consistent with the classifier module 222 and 262 in FIG. 2A and FIG. 2B.

In some embodiments, the data engine 102 adjusts the services provided to the entity. The adjustment is performed based on the final score, the classification, or both. In some examples, the adjustment is reducing or stopping one or more services when the entity is not likely to achieve the predefined outcome (e.g., performance). In some examples, the adjustment is improving the services when the entity in likely to achieve the predefined outcome. Additionally, the adjustment may include warning the entity when the entity is not likely to achieve the predefined outcome. In some examples, the data engine 102 is consistent with the data engine 350 in FIG. 3B. Also, in some examples, the data engine 102 is consistent with the data engine 200 and 250 in FIG. 2A and FIG. 2B.

In some embodiments, the classifier module 112 is used to classify the outcome or performance of an individual, a company, an object, and/or the like. Classification is performed based on features associated with the individual, the company, the object, and/or the like. In some examples, generated values (e.g., scores) are assigned to the features and the classifier module 112 uses the scores of the features to generate a classification decision. In some examples, the outcome is a generated (e.g., calculated) value such as a performance score based on the scores of the features. In some examples, the outcome is a Yes/No value.

As described in the examples below, the data engine determines (e.g., selects) a predetermined event in the first time span and a predefined outcome in the second time span. In some examples, the predetermined event is correlated to the predefined outcome. In some examples, the predetermined event is uncorrelated to the predefined outcome. In some examples, the data engine determines (e.g., selects) a predetermined event in the long-term and a predefined outcome in the short-term.

In some examples, the predefined outcome is the determination of whether a city street or bridge is uncongested. A feature for classifying the traffic on the street or bridge as congested or uncongested may be defined as the number of vehicles on the street or bridge. The predefined spans of time are set as one day for the first time span and one hour for the second time span. The traffic is measured per hour and the value assigned to each span is simply the number of vehicles traveling on the street or the bridge during the respective time span. The predetermined event is defined as a football game happening the next day. The score generating module generates a final score corresponding to an outcome, such as, the congestion on the street or bridge in the hour before the game. In some examples, the score is normalized between zero and one hundred and then is interpreted as the percent probability of the outcome to occur. In yet some other examples, and based on the score, the system controlling the bridge or the street changes the number of traffic lanes in the opposite direction to remedy the problem if the score is low, i.e., congestion is likely to happen. In some examples, the modeling module may additionally use other factors when generating the models, for example, gasoline price, toll of the street/bridge, maximum speed on the street/bridge, the weather forecast of the next day, and/or the like.

In some embodiments, the predefined outcome is the determination of whether the employees of a company make business trips. A database includes the travel data related to employees of a company. In some examples, the databases may include data related to travelling activities of one or more employees in periods equal to a first time span where the first time span may be one year. Also, the database may include data related to travelling activities of the same employees in periods equal to a second time where the second time span may be 3 months. In some examples, the predetermined event is defined that the company shares gain ten percent value in the next year. The score generating module generates a final score corresponding to a predefined outcome, for example, a predetermined number of business trips to occur in a final time span which is at least 3 months. In some examples, the score is normalized between zero and one hundred and then is interpreted as the percent probability of the outcome to occur. In some examples, the modeling module may additionally use other factors when generating the models, for example, gasoline price, weather conditions, economic downturn, and/or the like.

In some embodiments, the predefined outcome is the determination of whether an individual makes an exercise such as walking. A database includes the daily exercises related to the individual. For example, the database may include data related to the number of steps taken by an individual in a first time spans of one month while the database may also include data related to the number of steps taken by the same individual in a second time span of one day. In some examples, the predetermined event is defined as ten percent weight gain by the individual in the next month. The score generating module generates a final score corresponding to an outcome, for example, a predetermined number of steps to be taken by the same individual in a final time span which is at least a day, e.g., the next day. In some examples, the score is normalized between zero and one hundred and then is interpreted as the percent probability of the outcome to occur. In some examples, the modeling module may additionally use other factors when generating the models, for example, weather forecast, employment conditions, and/or the like.

In some embodiments, the predefined outcome is the determination of whether an individual makes online purchases. A database includes the online purchase activities performed by an individual. For example, the database may include data related to a number specific websites visited by the individual and online purchase activities occurring in a first time span of one year while the database may also include data related to the specific websites visited by the same individuals and online purchase activities occurred in a second time span of one month. In some examples, the predetermined event is defined as the individual receives a ten percent raise in the next year. The score generating module generates a final score corresponding to an outcome, for example, the outcome of a predetermined number of online purchase activities performed by the same individual in a final time span which is at least a month, i.e., the next month. In some examples, the score is normalized between zero and one hundred and then is interpreted as the percent probability of the number of online purchase activities to occur in the final time span. In some examples, the modeling module may additionally use other factors when generating the models, for example, whether the individual is married, the number of children, the age of children, employment conditions, and/or the like.

In some embodiments, the predefined outcome is the determination of the approval rating of a politician or a TV show. A database includes the data related to approval ratings, e.g., approval ratings of a TV show or approval ratings of a politician. For example, the database may include data related to the approval ratings in a first time span of one year while the database may include data related to the approval ratings in a second time span of one month. In some examples, the predetermined event selected is that a misuse of funds be reported for the TV station or the politician in the next year. The score generating module generates a final score corresponding to an outcome, for example, the outcome of having at least 70% approval rating in a final time span which is at least one month, e.g., in the next month. In some examples, the score is normalized between zero and one hundred and then is interpreted as the percent probability of having a specific approval rating in the final time span. In some examples, the modeling module may additionally use other factors when generating the models, for example, whether the politician or the TV show director is married, and/or the like.

In some embodiments, the predefined outcome is the determination that an individual makes a payment towards a credit balance. A database includes the online payment activities performed by an individual. For example, the database may include data related to online payments by the individual in a first time spans of three months while the database may include data related to online payments by the same individuals in a second time span of one month. In some examples, the predetermined event is that the individual going delinquent in the next 3 months. The score generating module generates a final score corresponding to an outcome, for example, the outcome that the individual makes an online payment in a final time span which is at least a month, i.e., in the next month. In some examples, the score is normalized between zero and one hundred and then is interpreted as the percent probability of the online payments in the final time span. In some examples, the modeling module may additionally use other factors when generating the models, for example, the percentage of months in the past 3, 6, and/or 12 months that the individual made payments, the number of months in the past 12 months the individual's account was past due (was delinquent), maximum balance in past 12 months, number of days in collections in the past 3 and/or 6 months, maximum balance in the past 3 months, number of days since a last payment, a last payment amount, and an average monthly purchase amount in past 6 months.

In some embodiments, the features used by the classifier module may have fuzzy values. In some examples, the traffic in a street instead of having a value may be categorized as heavy, mild, or occasional and the classifier module may use these fuzzy values to reach a classification.

In some embodiments, the modeling module implements Bayesian methodology such that a probability is assigned to a predefined outcome based on the prior data. In some examples, when new data becomes available, the new data becomes the next prior data.

In some embodiments, Gradient Boosting techniques are used to generate the first, second, and/or third behavior models. In some examples, the models are built in a stagewise fashion and optimization is performed by an arbitrary differentiable loss function.

In some examples, at least the first score is on a probability scale between zero and one and the final score is then calculated using the relation: second score*first score+third score*(1−first score).

In some embodiments, the collected data in different spans of time may be correlated. Additionally, generating the second behavior model and the third behavior model, by the modeling module, e.g., the modeling module 108 of FIG. 1, includes determining relationships in the collected data in different spans of time. The spans of time that are equal to the first time span and the second time span are defined and the relationships (e.g., correlation) of the collected data in the first time spans, in the second time spans, and between the first and second time spans are determined. In some embodiments, independent relationships in the collected data in different spans of time are determined.

In some embodiments, the first score has a first accuracy, the second score has a second accuracy, and the third score has a third accuracy. The final score has a final accuracy better than the first accuracy, the second accuracy, and the third accuracy.

In some embodiments, the operations further include determining the first accuracy by the score generating module and based on the first behavior model, determining the second accuracy by the score generating module and based on the second behavior model, and determining the third accuracy by the score generating module and based on the third behavior model. The operations further include determining the final accuracy by the score generating module and based on the first, second, and third scores. In some embodiments, the final accuracy is a prediction accuracy and thus it is a final prediction accuracy.

FIG. 4A illustrates an exemplary timeline with events on the timeline according to some embodiments. The diagram 400 shows the timeline 425 that may be related to the system 100 of FIG. 1. The timeline 425 shows a number of qualifying events 405 distributed on the timeline. The timeline 425 also shows a first time span 410. In some examples, the timeline 425 shows four qualifying events 405 in the first time span 410. As described above, the qualifying event 405 may correspond to a traffic measurement per hour, an online payment, and/or the like.

FIG. 4B illustrates an exemplary timeline with events on the timeline. The diagram 450 shows the timeline 425 of diagram 400 with the same qualifying events distributed on the timeline that may be related to the system 100 of FIG. 1. The diagram 400 also shows the second time spans 452, 454, 456, and 458. In some examples, as shown in FIGS. 4A and 4B, the first time span is 3 times the second time span and the first time span 410 may include the second time spans 452, 454, and 456. Also, in some examples, the second time span 452 includes two qualifying events 405, the second time span 454 does not include any qualifying event 405, the second time span 456 includes two qualifying events 405, and the second time span 458 includes one qualifying event 405. In some examples, the second time span has a duration of one month and the first time span has a duration equal to three months or three times the duration of the first time span.

Figure 5:
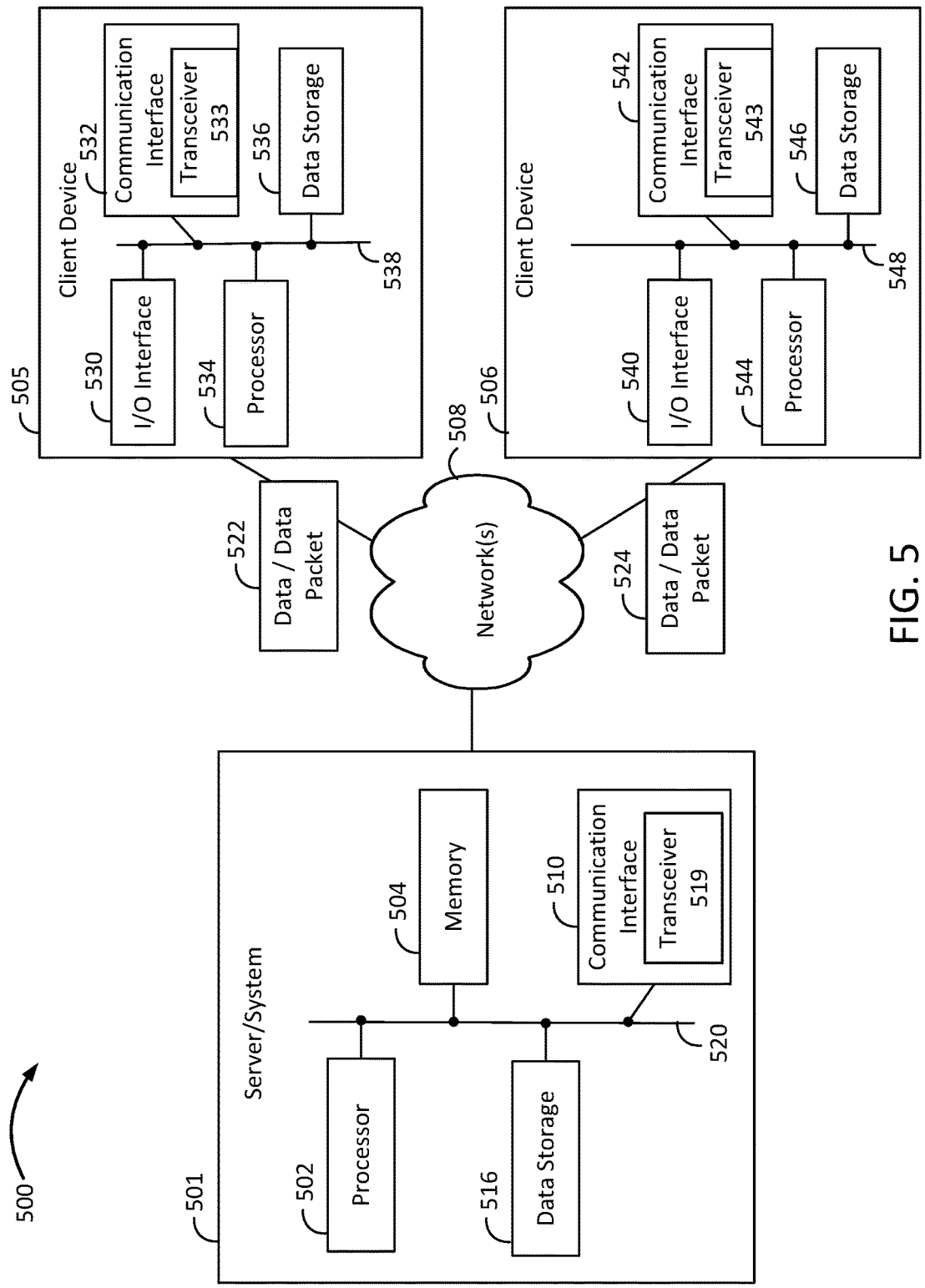
FIG. 5 is a block diagram of an exemplary system, according to some embodiments.

FIG. 5 is a block diagram of an exemplary network system 500, according to some embodiments. The network system 500, possibly referred to as the network system for providing services, may be configured to transfer data over one or more communication networks 508. In particular, the network system 500 may include the system/server 501. In some examples, system/server 501 may be consistent with system 300 of FIG. 3A. The system/server 501 may be configured to perform operations of a service provider, such as PayPal, Inc. of San Jose, Calif., USA. Further, the network system 500 may also include user device 505 and/or the user device 506 operated by their respective users. In practice, the system/server 501 and the user devices 505 and/or 506 may be configured to communicate over the one or more communication networks 508.

In some embodiments, the network system 500 may include the server 501. The server 501 includes the non-transitory memory 504. The server 501 of the network system 500 has one or more hardware processors 502 coupled to the non-transitory memory 504 and configured to read the instructions from the non-transitory memory 504 to cause the network system 500 to perform the operations as described further below.

The network system 500 may operate with more or less than the computing devices shown in FIG. 5, where each device may be configured to communicate over one or more communication networks 508, possibly to transfer data accordingly. The one or more communication networks 508 may also include a packet-switched network configured to provide digital networking communications, possibly to exchange data of various forms, content, type, and/or structure. The one or more communication networks 508 may include a data network such as a private network, a local area network, a wide area network, and/or the like. In some examples, the one or more communication networks 508 may include a communications network such as a telecommunications network and/or a cellular network with one or more base stations, among other possible networks.

The data/data packets 522 and/or 524 may be transferable using communication protocols such as packet layer protocols, packet ensemble protocols, and/or network layer protocols. In some examples, the data/data packets 522 and/or 524 may be transferable using transmission control protocols and/or internet protocols (TCP/IP). In various embodiments, each of the data/data packets 522 and 524 may be assembled or disassembled into larger or smaller packets of varying sizes. As such, data/data packets 522 and/or 524 may be transferable over the one or more networks 508 and to various locations in the network system 500.

In some embodiments, the server 501 may take a variety of forms. The server 501 may be an enterprise server, possibly configured with one or more operating systems to facilitate the scalability of the network system 500. In some examples, the server 501 may configured with a Unix-based operating system to integrate with a growing number of other servers, user devices 505 and/or 506, and one or more networks 508 over the network system 500.

In some embodiments, the system/server 501 may include multiple components, such as a hardware processor 502, a non-transitory memory 504, a non-transitory data storage 516, and/or a communication interface component 510, among other possible components, any of which may be communicatively linked via a system bus, network, or other connection mechanism 520. The hardware processor 502 may be implemented using a multi-purpose processor, a microprocessor, a special purpose processor, a digital signal processor (DSP) and/or other types of processing components. In some examples, the processor 502 may include an application specific integrated circuit (ASIC), a programmable system-on-chip (SOC), and/or a field-programmable gate array (FPGA) to process, read, and/or write data for providing services to numerous entities. In particular, the processor 502 may include a variable-bit (e.g., 64-bit) processor architecture specifically configured to facilitate the scalability of the increasing number of entities. As such, the one or more processors 502 may execute varying instructions sets (e.g., simplified and complex instructions sets) with fewer cycles per instruction than other conventional general-purpose processors to improve the performance of the server 501 for purposes of mass scalability and/or accommodation of growth.

The non-transitory memory component 504 and/or the data storage 516 may include one or more volatile, non-volatile, and/or replaceable data storage components, such as a magnetic, optical, and/or flash storage that may be integrated in whole or in part with the hardware processor 502. Further, the memory component 504 may include a number of instructions and/or instruction sets. The processor 502 may be coupled to the memory component 504 and configured to read the instructions to cause the server 501 to perform operations, such as those described in this disclosure, illustrated by the accompanying figures, and/or otherwise contemplated herein. Notably, the data storage 516 or memory 504 may be configured to store numerous user data, possibly including data that may be accessed often by the user devices 505 and/or 506. In some examples, the user data may include user ID and access codes or authentication tokens of a user.

The communication interface component 510 may take a variety of forms and may be configured to allow the server 501 to communicate with one or more devices, such as the user devices 505 and/or 506. In some examples, the communication interface component 510 may include a transceiver 519 that enables the server 501 to communicate with the user devices 505 and/or 506 via the one or more communication networks 508. Further, the communication interface component 510 may include a wired interface, such as an Ethernet interface, to communicate with the user devices 505 and/or 506. Yet further, the communication interface component 510 may include a wireless interface, such as a cellular interface, a Global System for Mobile Communications (GSM) interface, a Code Division Multiple Access (CDMA) interface, and/or a Time Division Multiple Access (TDMA) interface, among other possibilities. In addition, the communication interface 510 may include a wireless local area network interface such as a WI-FI interface configured to communicate with a number of different protocols. As such, the communication interface 510 may include a wireless interface configured to transfer data over short distances utilizing short-wavelength radio waves in approximately the 2.4 to 2.485 GHz range. In some instances, the communication interface 510 may send/receive data or data packets 522 and/or 524 to/from user devices 505 and/or 506.

The user devices 505 and 506 may also be configured to perform a variety of operations such as those described in this disclosure, illustrated by the accompanying figures, and/or otherwise contemplated herein. Notably, the data storage 536/546 of the user devices 505 and 506 may be configured to store numerous user data, possibly including data that may be accessed often by the user devices 505 and 506 such as geographic data, movement data, exercise data, among other types of data associated with the user. In some examples, the user devices 505 and 506 may be configured to authenticate a user of the user devices 505 and 506 based on data stored, e.g., a security token, in the user devices. Alternatively, the server 501 may authenticate a user based on receiving the security token from the user devices 505 and 506.

In some embodiments, the user devices 505 and 506 may include or be implemented as a user device system, a personal computer (PC) such as a laptop device, a tablet computer device, a wearable computer device, a head-mountable display (HMD) device, a smart watch device, and/or other types of computing devices configured to transfer data. The user devices 505 and 506 may include various components, including, for example, input/output (I/O) interfaces 530 and 540, communication interfaces 532 and 542 that may include transceivers 533 and 543, hardware processors 534 and 544, and non-transitory data storages 536 and 546, respectively, all of which may be communicatively linked with each other via a system bus, network, or other connection mechanisms 538 and 548, respectively.

The I/O interfaces 530 and 540 may be configured to receive inputs from and provide outputs to respective users of the user devices 505 and 506. In some examples, the I/O interface 530 may include a display that provides a graphical user interface (GUI) configured to receive an input from a user. Thus, the I/O interfaces 530 and 540 may include displays configured to receive inputs and/or other input hardware with tangible surfaces, such as touchscreens with touch sensitive sensors and/or proximity sensors. The I/O interfaces 530 and 540 may also include a microphone configured to receive voice commands, a computer mouse, a keyboard, and/or other hardware to facilitate input mechanisms, possibly to authenticate a user. In addition, I/O interfaces 530 and 540 may include output hardware such as one or more sound speakers, other audio output mechanisms, haptic feedback systems, and/or other hardware components.

In some embodiments, communication interfaces 532 and 542 may include or take a variety of forms. In some examples, communication interfaces 532 and 542 may be configured to allow user devices 505 and 506, respectively, to communicate with one or more devices according to a number of protocols described and/or contemplated herein. For instance, communication interfaces 532 and 542 may be configured to allow user devices 505 and 506, respectively, to communicate with the server 501 via the one or more communication networks 508. The hardware processors 534 and 544 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components.

The non-transitory data storages 536 and 546 may include one or more volatile or non-volatile data storages, removable or non-removable data storages, and/or a combination of such data storages that may be integrated in whole or in part with the hardware processors 534 and 544, respectively. Further, data storages 536 and 546 may include non-transitory memories that store instructions and/or instructions sets. Yet further, the processors 534 and 544 may be coupled to the data storages 536 and 546, respectively, and configured to read the instructions from the non-transitory memories to cause the user devices 505 and 506 to perform operations, respectively, such as those described in this disclosure, illustrated by the accompanying figures, and/or otherwise contemplated herein.

In some embodiments, the communication interface 510 is coupled to the one or more processors 502. In some examples, a security module consistent with the security module 322 of FIG. 3B receives an authentication request from a client device, e.g., client device 505/506 of a requester through the network interface 510 and a network 508. In response to authenticating the requester, a security key is transmitted through the network interface 510 and the network to the client device 505/506 of the requester. The request to generate the final score and to classify the entity is received through the network interface 510 and the network. The data engine transmits encrypted data, corresponding to the final score of the entity and the entity classification through the network interface 510 and the network to the requester. The client device 505/506 of the requester uses the received security key to automatically display the encrypted data.

In some embodiments, the classification of the entity includes assigning the entity to a success group if the final score is greater than a first predetermined threshold, assigning the entity to a failure group if the final score is less than a second predetermined threshold, and assigning the entity to a neutral group if the final score is between the first and second thresholds. The classification of the entity also includes adjusting the services provided to the entity. Adjusting may include stopping at least one of services if the entity is assigned to the failure group. In some examples, when the entity is assigned to the failure group, the adjustment may include sending notifications, e.g., sending one or more warning notifications.

In some embodiments, updated data of the entity is received by an incremental data module 332 of the data engine 350. The received updated data is temporarily stored in a memory 304 separate from the database 308. The updated data is compared with existing data corresponding to the entity in the database 308. A relationship between the received updated data and the data in the database 308 is detected. Based on the detected relationships, it is determined whether to store the updated data in the database 308, or to discard the updated data.

In some embodiments, updated data for the entity is received by an incremental data module 332 of the data engine 350. The received updated data is constantly monitored. The first score, second score, and the third score is automatically updated based at least on the received updated data. The final score is also automatically updated based at least on the updated first score, second score, and the third score. The entity is automatically reclassified based at least on the updated final score.

Figure 6:
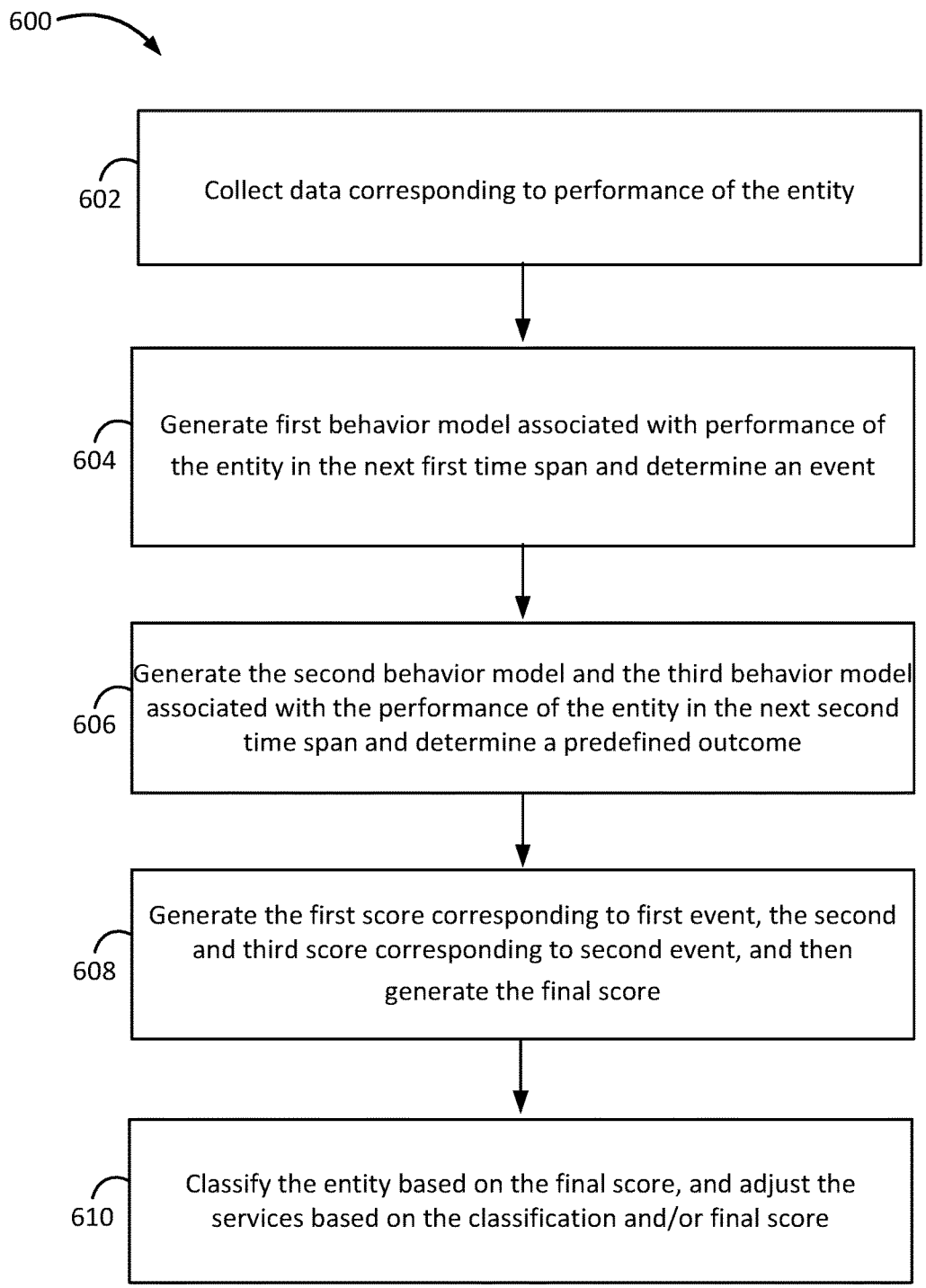
FIG. 6 illustrates an exemplary method, according to some embodiments.

FIG. 6 illustrates an exemplary method 600, according to some embodiments. Notably, one or more steps of the method 600 described herein may be omitted, performed in a different sequence, and/or combined with other methods for various types of applications contemplated herein. The method 600 may be performed by any of the data engines 102, 200, 250, 320, and/or 350. The method 600 can be used as a method of providing services to an entity as well as a method of providing services by an entity. In some embodiments, one or more processes, e.g., steps of the method 600, is implemented by instructions (e.g., software instructions) stored on the non-transitory memory, e.g., non-transitory memory 304 of FIG. 3A.

As shown in FIG. 6, at step 602, the method 600 may include collecting data corresponding to performance of the entity. In some examples, collecting data may be performed by the data collection and processing module 104 of data engine 102 and/or the data collection and processing module 334 of data engine 350. In some examples and as discussed above the collected data might be the traffic data of the bridge or street, the travel data of the employees of a company, daily exercise data of an individual, online purchasing data of an individual, approval rating data of a TV show or a politician, data related an individual's the online payment, and/or the like.

In some embodiments, the collected data is processed. In some examples, referring to FIG. 1, the data collection and processing module 104 processes the collected data 115 including normalizing the data, removing outliers, and/or the like and providing the processed data 116.

At step 604, the method 600 may include generating a first behavior model associated with performance of an entity in a first time span and determining an event in the first time span. The first behavior model can be generated based at least on the collected data. In some examples, determining (e.g., selecting) the predetermined event may be performed by the data engine 102, the date engine 200, and/or the data engine 250. In some examples, generating the first behavior model can be performed by the modeling module 108, the first time span behavior model generator 204 of the modeling module 202, and/or the long-term behavior model generator 254 of model generator 252. In some examples, the first time span may correspond to the next three months. In some embodiments, and as discussed above the predetermined event might be a football game occurring in a next day, a company's shares gain ten percent value in a next year, a ten percent weight gain by an individual in a next month, an individual receiving a ten percent raise in a next year, a reported misuse of funds be a TV station or a politician in the next year, an individual going delinquent in a next 3 months, and/or the like.

At step 606, the method 600 may include generating the second behavior model and the third behavior model associated with the performance of the entity in the second time span and determining a predefined outcome in the second time span. In some examples, determining (e.g., selecting) the predefined outcome may be performed by the data engine 102, the date engine 200, and/or the data engine 250. In some examples, generating the second behavior model can be performed by the modeling module 108, the second time span behavior model generator 206 of the modeling module 202, and/or the short-term behavior model generator 256 of model generator 252. Likewise, generating the third behavior model can be performed by the modeling module 108, modeling module 326, the second time span behavior model generator 208 of the modeling module 202, and/or the short-term behavior model generator 258 of model generator 252.

In some examples, the second behavior model can be generated using the collected data and based on the occurrence of a determined event (e.g., event-A) in the first time span. Also, the third behavior model can be generated using the collected data and based on the occurrence of another determined event (e.g., event-B) in the first time span. In some examples, event-B is correlated to event-A. In some examples, event-B is completely correlated to event-A such that it is a non-occurrence of event-A.

In some examples, the first time span is a year and the second time span is a month, the first time span is a month and the second time span is a day, the first time span is a day and the second time span is an hour, and/or the like. In some examples, the second time span has a larger duration than the first time span.

In some embodiments, and as discussed above the predefined outcome may occur in a final time span and might be a determination of whether a city street or bridge is uncongested, a determination of whether the employees of a company make a predetermined number of business trips, a determination of whether an individual takes a predetermined number of steps, a determination of whether an individual makes online purchases, a determination of the approval rating of a politician or a TV show, a determination of whether an individual making a payment in the next month, and/or the like.

At step 608, the method 600 may include generating the first score, the second score, and the third score and then generating the final score. In some examples, generating the scores may be performed by the score generating module 110 of data engine 102, the score generating module 324 data engine 350, the score generating module 210 data engine 200, and/or the score generating module 260 of data engine 250.

In some examples, and as discussed above, the first score corresponds to predicting the occurrence of the predetermined event in a first time span, such as predicting the occurrence of the football game in a next day, predicting the occurrence of company's shares gaining ten percent in a next year, predicting the occurrence of an individual receiving a ten percent raise in a next year, predicting the occurrence of a reported misuse of funds by a TV station or a politician in a next year, predicting the occurrence of an individual going delinquent in a next 3 months, and/or the like.

In some examples, the second score corresponds to the predefined outcome such as predicting the occurrence of the predefined outcome in a second time span. In some examples, and as discussed above, the second score corresponds to predicting the occurrence of the predefined outcome given the predetermined event has occurred such as predicting a street or bridge being uncongested in the next hour given a football game occurs in the next day, predicting a number of business trips for a company in the next 3 months given the company shares value raise ten percent in the next year, predicting a number of steps taken by an individual in the next day given a ten percent weight gain by the individual in a next month, predicting a number of online purchases made by an individual in the next month given the individual receiving a ten percent raise in a next year, predicting the approval rating of a politician or a TV show in the next month given a reported misuse of funds by the TV station or the politician in the next year, predicting making a payment by an entity in the next month given the entity going delinquent in the next 3 months, and/or the like.

In some examples, the third score corresponds to the predefined outcome such as predicting the occurrence of the predefined outcome in a second time span. In some examples, and as discussed above, the third score corresponds to predicting the occurrence of the predefined outcome given the predetermined event has not occurred such as predicting a street or bridge being uncongested in the next hour given no football game occurs in the next day, predicting a number of business trips for a company in the next 3 months given the company shares value does not raise ten percent in the next year, predicting a number of steps taken by an individual in the next day given the individual does not gain a ten percent weight in a next month, predicting a number of online purchases made by an individual in the next month given the individual does not receive a ten percent raise in a next year, predicting the approval rating of a politician or a TV show in the next month given a the misuse of funds by the TV station or the politician is not reported in the next year, predicting making a payment by an entity in the next month given the entity does not go delinquent in the next 3 months, and/or the like.

At step 610, the method 600 may include classifying the entity based on the final score and adjusting the services based on the classification and/or the final score. In some examples, classifying the entity can be performed by the classifier module 112, the classifier module 222, the classifier module 262, the classifier module 328, and/or the like. As discussed above, based on the final score and/or the classification the service provided to the entity, the services provided by the entity, or actions performed by the entity can be adjusted. In some examples, the number of lanes of the street or bridge is adjusted to prevent congestion, the number of business trips is reduced by giving an incentive to the employees, the number of steps taken by the individual is increased by giving an incentive to the individual, the number of online purchases made by the individual is increased by sending coupons to the individual, the services provided to the entity are decreases so the entity makes on time payments, and/or the like.

The processes of method 600 are now described in the context of representative example related to determining whether an entity will make a payment during a next payment cycle. In some examples, at step 602, data related to an account of an entity that is in delinquency and is more than two payment cycles delinquent is collected. A short-term time span equal to one month (i.e., the payment cycle) and a long-term time span equal to three months are selected. At step 604, a long-term (e.g., 3 month) behavior prediction model of the entity is created based on the collected data. Also, at step 604, a predetermined event is selected. The predetermined event is selected as the event that the (account of the) entity misses more than two cycles of payment in the next three payment cycles, i.e., the entity account would become more than 2+ payments delinquent in the next three payment cycles. The long-term behavior model predicts whether the entity account would become more than 2+ payments delinquent in the next three payment cycles.

In some examples, at step 606, two short-term (e.g., 1 month) behavior prediction models of the entity are created based on the collected data. Also, at step 606, an outcome is defined as that "the account would make a payment in the next payment cycle". A first short-term behavior prediction model is created. The first short-term behavior prediction model is created based on that the predetermined event happens. Thus, the first short-term behavior prediction model predicts whether the entity account would make a payment in the next payment cycle given the entity account would become more than 2+ payments delinquent in the next three payment cycles (long-term). Additionally, at step 606, a second short-term behavior prediction model is created. Contrary to the first short-term behavior prediction model, the second short-term behavior prediction model is created based on that the predetermined event does not happen. Thus, the second short-term behavior prediction model predicts whether the entity account would make a payment in the next payment cycle given the entity account would not become more than 2+ payments delinquent in the next three payment cycles.

In some examples, at step 608, the first score, the second score, and the third score are generated. The first score is generated based on the long-term behavior prediction model and corresponds to a prediction that the predetermined event of the entity account become more than 2+ payments delinquent in the next three payment (long term) occurs. The second score is generated based on the short-term behavior prediction model and corresponds to a prediction that the account would make a payment in the next payment cycle (short-term), given it would become more than 2+ payments delinquent in the next three payment cycles (long-term). The third score is generated based on the short-term behavior prediction model and corresponds to a prediction that the account would make a payment in the next payment cycle (short-term), given it would deteriorate to one cycle delinquent or become current in the next three payment cycles (long-term). The second score and the third score are based on two complementary events of i) being more than 2+ payments delinquent, and 2) being one cycle delinquent or becoming current. The final score is determined based on the first score, the second score, and the third score as: final score=second score*first score+third score*(1−first score). In some examples, the final score corresponds to a prediction of the outcome in the short-term, e.g., making a payment in the next payment cycle. In some examples, the scores are probabilities and the final score is a probability of making a payment in the next payment cycle.

The present disclosure, the accompanying figures, and the claims are not intended to limit the present disclosure to the example embodiments disclosed. As such, it is contemplated that various alternate embodiments and/or modifications to the embodiment disclosed, whether explicitly described or implied herein, are possible in light of the disclosure and/or the figures. Having thus described embodiments of the present disclosure, persons of ordinary skill in the art will recognize that changes may be made to the embodiments disclosed without departing from the scope of the present disclosure.

What is claimed is:

1. A system for providing one or more services to an entity, comprising:
   a non-transitory memory storing at least one database; and
   one or more hardware processors configured to execute instructions to cause the system to perform operations comprising:
      collecting, by a data collection and processing module of a data engine, from the database, data corresponding to a performance of the entity;
      generating, by a modeling module of the data engine, a first behavior model associated with the performance of the entity in a first time span based at least on the collected data;
      determining whether a predetermined event occurred in the first time span;
      generating, by the modeling module and based at least on the collected data, a second behavior model and a third behavior model associated with the performance of the entity in a second time span, wherein the second behavior model is generated conditioned an occurrence of the predetermined event during the first time span and the third behavior model is generated conditioned on a non-occurrence of the predetermined event during the first time span;
      determining a predefined outcome in the second time span;
      generating, by a score generating module of the data engine, a first score based at least on the first behavior model and corresponding to the occurrence of the predetermined event, a second score based at least on the second behavior model, and a third score based at least on the third behavior model, wherein the second and third scores correspond to a likelihood that the predefined outcome occurs;
      generating, by the score generating module, and based at least on the first score, the second score, and the third score, a final score that corresponds to achieving the predefined outcome corresponding to the performance of the entity in a final time span, the final time span having a duration greater than or equal to a minimum of a duration of the first time span and a duration of the second time span;
      classifying the entity into two or more groups based at least on the final score by a classifier module of the data engine; and
      automatically adjusting at least one of the one or more services provided to the entity based on the final score, the classification, or both.

2. The system of claim 1, wherein the modeling module is configured to implement Bayesian methodology, Gradient Boosting techniques, or both to generate the first, the second, and the third behavior models.

3. The system of claim 1, wherein at least the first score is generated on a probability scale between zero and one, and the final score is calculated as second score*first score+third score*(1−first score).

4. The system of claim 1, wherein the first score has a first accuracy, the second score has a second accuracy, the third score has a third accuracy, and the final score has a final prediction accuracy better than the first accuracy, the second accuracy, and the third accuracy; and wherein the operations further comprise:
determining, by the score generating module and based at least on the first behavior model, the second behavior model, and the third behavior model, the first accuracy, the second accuracy, the third accuracy, and the final prediction accuracy.

5. The system of claim 1, wherein collecting data by the data collection and processing module further comprises normalizing data and removing one or more outliers.

6. The system of claim 1, wherein generating the second behavior model and the third behavior model further comprises determining independent relationships in the collected data in different spans of time equal to the first time span and the second time span.

7. The system of claim 1, wherein the operations performed further comprise:
receiving updated data for the entity by an incremental data module of the data engine;
monitoring the received updated data;
automatically updating the first score, the second score, and the third score based at least on the received updated data;
automatically generating an updated final score based at least on the updated first score, the second score, and the third score; and
automatically reclassifying the entity based at least on the updated final score.

8. The system of claim 1, wherein the classification of the entity further comprises:
assigning the entity to a success group if the final score is greater than a first predetermined threshold, assigning the entity to a failure group if the final score is less than a second predetermined threshold, and assigning the entity to a neutral group if the final score is between the first and second predetermined thresholds; and
wherein adjusting the services further comprises sending notifications or stopping at least one of the one or more services when the entity is assigned to the failure group.

9. A non-transitory machine-readable medium having stored thereon machine-readable instructions executable to cause a machine to perform operations comprising:
providing one or more services to an entity;
collecting, by a data collection and processing module of a data engine, from a database, data corresponding to a performance of the entity;
generating, by a modeling module of the data engine, a first behavior model associated with the performance of the entity in a first time span based at least on the collected data;
determining whether a predetermined event occurred in the first time span;
generating, by the modeling module and based at least on the collected data, a second behavior model and a third behavior model associated with the performance of the entity in a second time span, wherein the second behavior model is generated conditioned on an occurrence of the predetermined event during the first time span and the third behavior model is generated conditioned on a non-occurrence of the predetermined event during the first time span;
determining a predefined outcome in the second time span;
generating, by a score generating module of the data engine, a first score based at least on the first behavior model and corresponding to the occurrence of the predetermined event, a second score based at least on the second behavior model, and a third score based at least on the third behavior model, wherein the second and third scores correspond to a likelihood that the predefined outcome occurs; and
generating, by the score generating module, and based at least on the first score, the second score, and the third score, a final score that corresponds to achieving the predefined outcome corresponding to the performance of the entity in a final time span, the final time span having a duration greater than or equal to a minimum of a duration of the first time span and a duration of the second time span.

10. The non-transitory machine-readable medium of claim 9, wherein the operations further comprises:
classifying the entity into two or more groups based at least on the final score by a classifier module of the data engine; and
automatically adjusting at least one of the one or more services provided to the entity based on the final score, the classification, or both.

11. The non-transitory machine-readable medium of claim 10, wherein the first score has a first accuracy, the second score has a second accuracy, the third score has a third accuracy, and the final score has a final prediction accuracy better than the first accuracy, the second accuracy, and the third accuracy.

12. The non-transitory machine-readable medium of claim 11, the operations further comprise:
determining, by the score generating module and based at least on the first behavior model, the second behavior model, and the third behavior model, the first accuracy, the second accuracy, the third accuracy, and the final prediction accuracy.

13. The non-transitory machine-readable medium of claim 10, wherein generating the second behavior model and the third behavior model further comprises determining relationships in the collected data in different spans of time equal to the first time span and the second time span.

14. The non-transitory machine-readable medium of claim 10, wherein the operations further comprise:
receiving updated data for the entity by an incremental data module of the data engine;
monitoring the received updated data;
automatically updating the first score, the second score, and the third score based on the received updated data;
automatically generating an updated final score based at least on the updated first score, the second score, and the third score; and
automatically reclassifying the entity based at least on the updated final score.

15. A method of providing one or more services to an entity, comprising:
collecting, by a data engine executing on a server, from a database, data corresponding to a performance of the entity;
generating a first behavior model associated with the performance of the entity in a first time span, wherein the collected data is used by the data engine to generate the first behavior model;
determining whether a predetermined event occurred in the first time span;
generating a second behavior model and a third behavior model associated with the performance of the entity in a second time span using the collected data, wherein the second behavior model is generated conditioned at least on an occurrence of the predetermined event during the first time span and the third behavior model is generated conditioned at least on a non-occurrence of the predetermined event during the first time span;

determining a predefined outcome in the second time span;

generating, by the data engine, a first score based at least on the first behavior model and corresponding to the occurrence of the predetermined event, a second score based at least on the second behavior model, and a third score based at least on the third behavior model, wherein the second and third scores correspond to a likelihood that the predefined outcome occurs;

generating, based at least on the first score, the second score, and the third score, a final score that corresponds to achieving the predefined outcome corresponding to the performance of the entity in a final time span, the final time span having a duration greater than or equal to a minimum of a duration of the first time span and a duration of the second time span;

classifying the entity into two or more groups based at least on the final score by the data engine; and adjusting at least one of the one or more services provided to the entity based on the final score, the classification, or both.

16. The method of claim 15, further comprising:
generating the first, the second, and the third behavior models based on Bayesian methodology, Gradient Boosting techniques, or both.

17. The method of claim 15, further comprising:
generating, at least the first score, on a probability scale between zero and one; and
calculating the final score as second score * first score+ third score*(1−first score).

18. The method of claim 15, further comprising:
receiving updated data for the entity by the data engine;
monitoring the received updated data;
automatically updating the first score, the second score, and the third score based on the received updated data;
automatically generating an updated final score based at least on the updated first score, the second score, and the third score; and
automatically reclassifying the entity based at least on the updated final score.

19. The method of claim 15, wherein the first score has a first accuracy, the second score has a second accuracy, the third score has a third accuracy, and the final score has a final prediction accuracy better than the first accuracy, the second accuracy, and the third accuracy; and
wherein the method further comprises:
determining, by the data engine and based at least on the first behavior model, the second behavior model, and the third behavior model, the first accuracy, the second accuracy, the third accuracy, and the final prediction accuracy.

20. The method of claim 15, wherein collecting data corresponding to the performance of the entity comprises normalizing data and removing one or more outliers.

* * * * *